United States Patent
Chen

(10) Patent No.: US 12,067,235 B2
(45) Date of Patent: Aug. 20, 2024

(54) DATA STORAGE DEVICE AND DATA STORAGE SYSTEM

(71) Applicant: Silicon Motion, Inc., Hsinchu County (TW)

(72) Inventor: Chen-Hao Chen, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/884,581

(22) Filed: Aug. 10, 2022

(65) Prior Publication Data

US 2023/0176733 A1 Jun. 8, 2023

(30) Foreign Application Priority Data

Dec. 8, 2021 (TW) ................... 110145793

(51) Int. Cl.
*G06F 3/00* (2006.01)
*G06F 3/06* (2006.01)

(52) U.S. Cl.
CPC .......... *G06F 3/0608* (2013.01); *G06F 3/0629* (2013.01); *G06F 3/0688* (2013.01)

(58) Field of Classification Search
None
See application file for complete search history.

(56) References Cited

U.S. PATENT DOCUMENTS

| 9,904,651 | B2 | 2/2018 | Park | |
|---|---|---|---|---|
| 2014/0208004 | A1 | 7/2014 | Cohen | |
| 2016/0070493 | A1* | 3/2016 | Oh | G06F 3/0679 711/104 |
| 2023/0152993 | A1* | 5/2023 | Oh | G06F 3/0634 711/154 |

FOREIGN PATENT DOCUMENTS

| TW | 200931422 | | 7/2009 |
| TW | 201123641 | A1 | 7/2011 |
| TW | I432960 | B | 4/2014 |
| TW | 201435602 | A | 9/2014 |
| TW | I590056 | B | 7/2017 |

* cited by examiner

*Primary Examiner* — Midys Rojas
(74) *Attorney, Agent, or Firm* — Winston Hsu

(57) ABSTRACT

A data storage device includes multiple storage modules. Each storage module includes a storage which having a memory device and a first memory controller and a second memory controller. The first memory controller is coupled to the memory device for accessing the memory device. The second memory controller is coupled to the storage for accessing the storage. The first memory controller includes a first transmission interface. The second memory controller includes a second transmission interface. The first memory controller and the second memory controller communicate with each other through the first transmission interface and the second transmission interface.

15 Claims, 5 Drawing Sheets

DATA STORAGE DEVICE AND DATA STORAGE SYSTEM

BACKGROUND OF THE INVENTION

1. Field of the Invention

The invention relates to a mass data storage device, more particular to a mass data storage device having a hierarchical structure to achieve capacity expansion.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives (SSD), Embedded Multi Media Cards (eMMC) and Universal Flash Storage (UFS)—have been used widely for a variety of purposes.

Along with the widely use of data storage devices, the user requirements for the capacity of the data storage devices is also rapidly increased. However, the existing data storage devices have a predetermined capacity limit in general. For example, the current upper limit of the capacity of a SSD storage may be 4 terabytes (TB). Therefore, how to expand the capacity of a data storage device in a simple way based on the design of existing storages is a topic worthy of concerning.

SUMMARY OF THE INVENTION

It is an objective of the invention to provide a mass data storage device that is structured on the basis of design of existing storages and using a hierarchical structure to achieve capacity expansion.

According to an embodiment of the invention, a data storage device comprises a plurality of storage modules. Each storage module comprises a storage, having a memory device and a first memory controller, and a second memory controller. The first memory controller is coupled to the memory device and configured to access the memory device. The second memory controller is coupled to the storage and configured to access the storage. The first memory controller comprises a first transmission interface, the second memory controller comprises a second transmission interface, and the first memory controller and the second memory controller communicate with each other through the first transmission interface and the second transmission interface.

According to another embodiment of the invention, a data storage device comprises a plurality of memory devices, a plurality of first memory controllers and a plurality of second memory controllers. One of the first memory controllers is coupled between one of the memory devices and one of the second memory controllers and configured to access said one of the memory devices. The first memory controllers and the second memory controllers are the same memory controllers.

According to yet another embodiment of the invention, a data storage system comprises a plurality of storages, a plurality of second memory controllers and a bridge controller. Each storage comprises a memory device and a first memory controller. The first memory controller is coupled to the memory device and configured to access the memory device. The second memory controllers is coupled to the storages and configured to access the storages. One of the second memory controllers and one of the storages form a storage module. The bridge controller is coupled to the second memory controllers and configured to access the storages through the second memory controllers.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
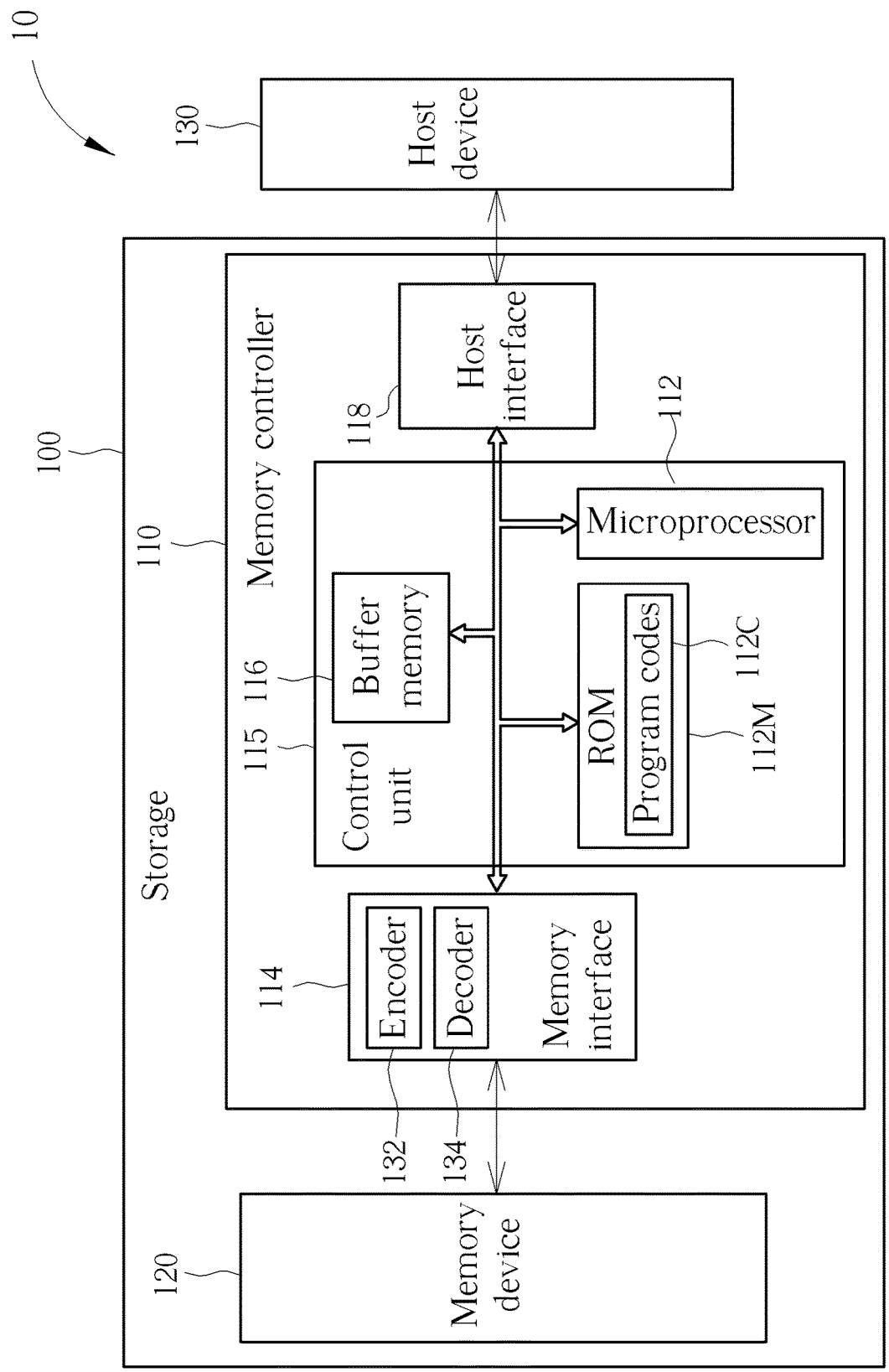
FIG. 1 shows a block diagram of an exemplary storage according to an embodiment of the invention.

FIG. 1 shows a block diagram of an exemplary storage according to an embodiment of the invention. The storage 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The storage 100 may be coupled to a host device 130 directly or through a bridge device. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be configured to control operations of the host device 130, and the power supply circuit may be configured to provide the processor, the RAM, and the storage 100 with power. For example, the power supply circuit may output one or more driving voltages to the storage 100. The storage 100 may obtain the one or more driving voltages from the host device 130 as the power of the storage 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The microprocessor 112, the ROM 112M and the buffer memory 116 may form a control unit 115 of the memory controller 110. The ROM 112M is configured to store program codes 112C. The microprocessor 112 is configured to execute the program codes 112C, thereby controlling access to the memory device 120. The program codes 112C may comprise one or more program modules, such as the boot loader code. When the storage 100 obtains power from the host device 130, the microprocessor 112 may perform an initialization procedure of the storage 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the storage 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the storage 100 may be a portable storage (for example, the memory card in compliance with the SD/MMC, CF, MS and/or XD standard), and the host device 130 may be an electronic device, such as a mobile phone, a notebook computer, a desktop computer . . . etc., capable of connecting to the storage 100. In another embodiment of the invention, the storage 100 may be a solid state hard disk or an embedded storage in compliance with the UFS or the eMMC standards, and may be equipped in an electronic device such as a mobile phone, a notebook computer, or a desktop computer. In such an embodiment, the host device 130 may be a processor of the electronic device.

Figure 2:
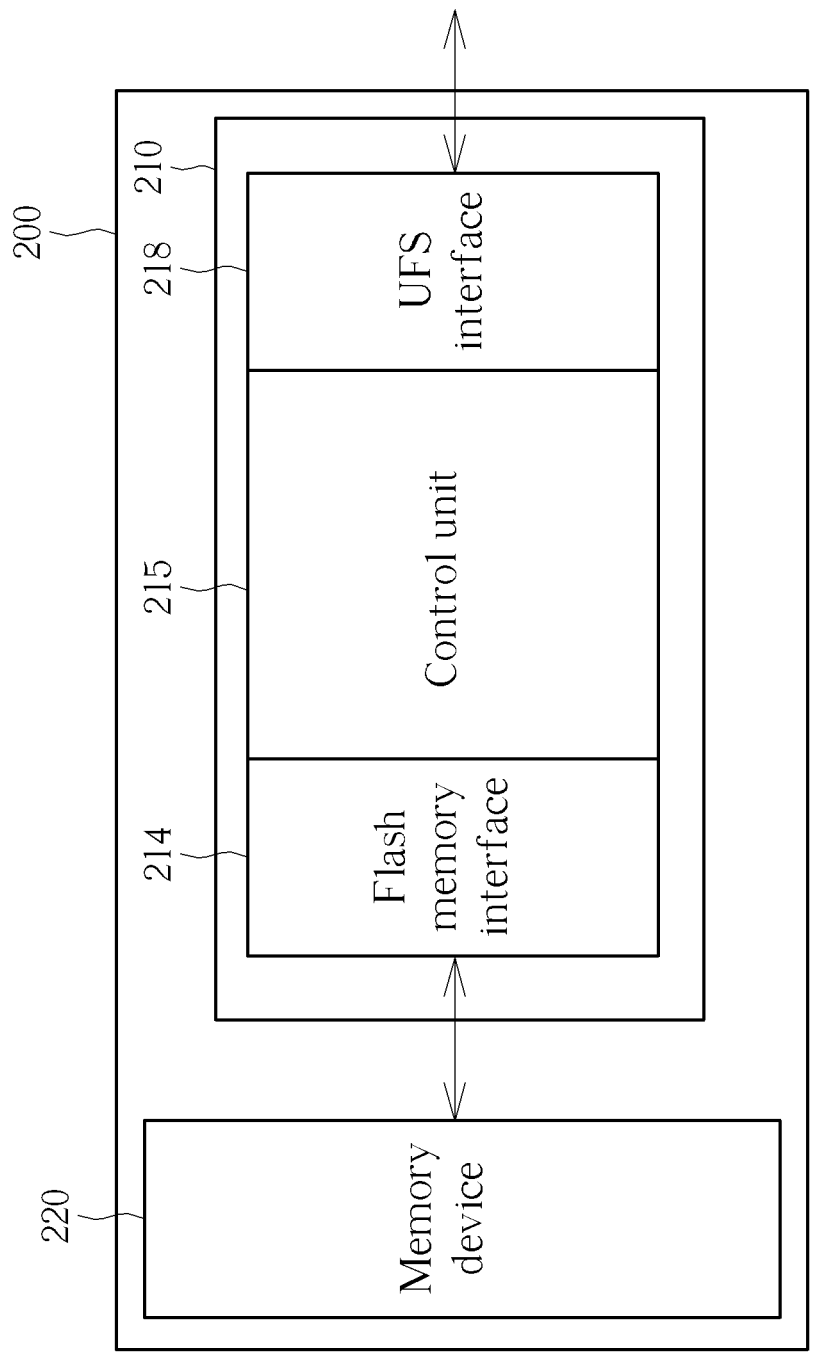
FIG. 2 shows a simplified block diagram of the exemplary storage according to an embodiment of the invention.

FIG. 2 shows a simplified block diagram of the exemplary storage according to an embodiment of the invention, wherein the components inside the memory controller are simplified into three parts: the host interface, the memory interface and the control unit, so as to simplify the description in the following paragraphs. As shown in FIG. 2, the storage 200 may comprise a memory device 220 and a memory controller 210. The memory controller 210 may access the memory device 220 and control operations of the memory device 220. The memory controller may be a non-volatile (NV) memory device, such as the above-mentioned flash memory.

In an embodiment of the invention, the memory device 220 may be a NAND type flash memory and the storage 200 may be implemented as an UFS device. Therefore, in this embodiment, the memory controller 210 may comprise an UFS interface 218, a flash memory interface 214 and a control unit 215. The UFS interface 218 may be the aforementioned host interface and the flash memory interface 214 may be the aforementioned memory interface. The control unit 215 may comprise a microprocessor, a ROM and a buffer memory as shown in FIG. 1. The control unit 215 may communicate with another device, such as a host device (not shown in FIG. 2), through the UFS interface 218 and in compliance with the UFS protocol, and the control unit 215 may access the memory device 220 through the flash memory interface 214.

As described above, the existing storages have a predetermined capacity upper limit. As an example, the storage 100 as shown in FIG. 1 or the storage 200 as shown in FIG. 2 may at most comprise a predetermined number of flash memory dies due to the circuit size constraints. Therefore, the storage 100/200 may have a predetermined capacity upper limit. In the embodiments of the invention, based on the design of the existing storages, a hierarchical structure is utilized to expand the storage capacity so as to form a large-capacity data storage device (that is, a mass data storage device).

Figure 3:
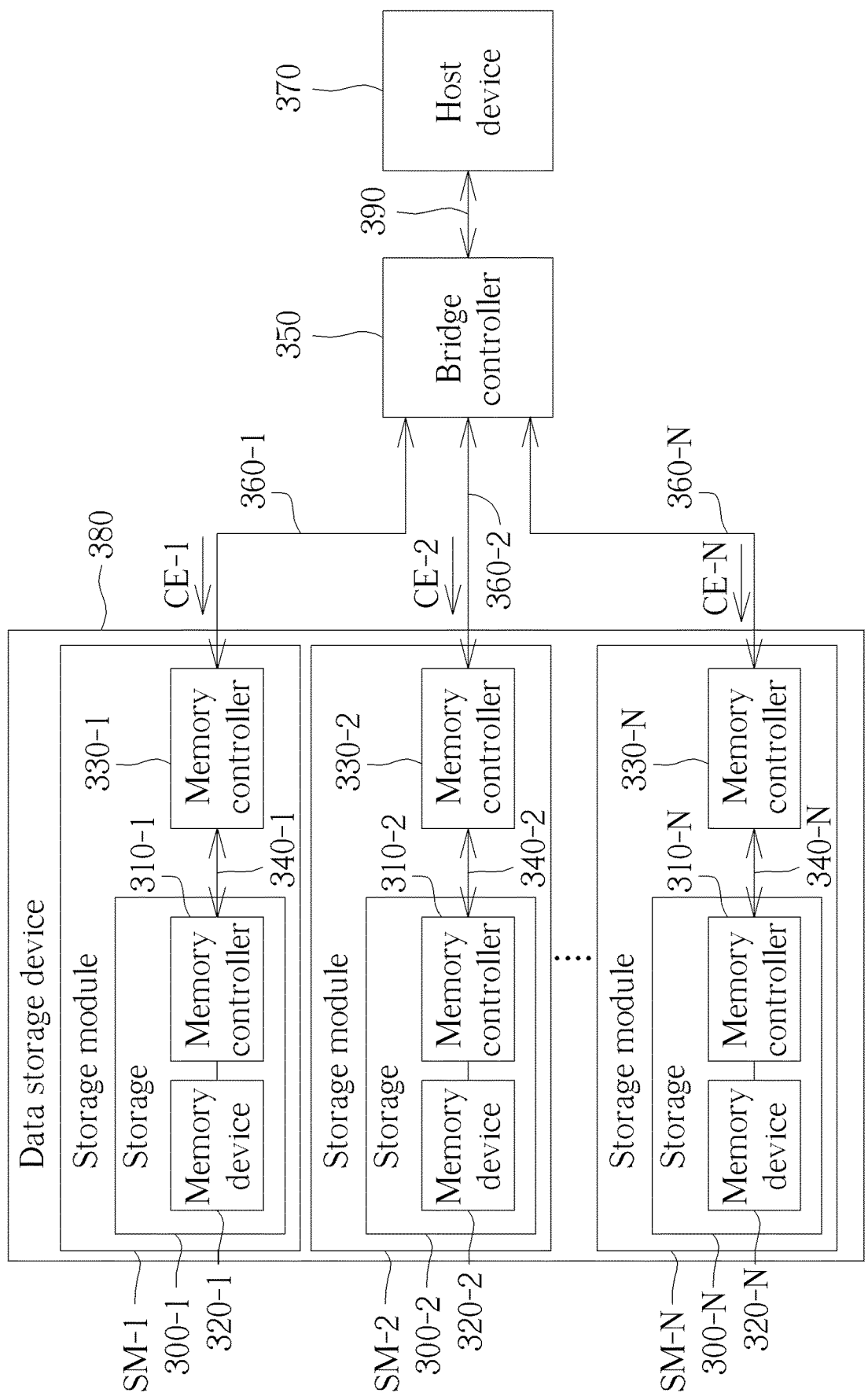
FIG. 3 shows a block diagram of an exemplary data storage system according to an embodiment of the invention.

FIG. 3 shows a block diagram of an exemplary data storage system according to an embodiment of the invention. According to an embodiment of the invention, the data storage system may at least comprise a bridge controller 350 and a data storage device 380. The data storage device 380 may comprise a plurality of storage modules SM-1, SM-2, . . . SM-N, where N is a positive integer greater than 1. Each storage module may comprise a storage, such as one of the storages 300-1, 300-2, . . . 300-N and a memory controller, such as one of the memory controllers 330-1, 330-2, . . . 330-N. The memory controllers 330-1, 330-2, . . . 330-N may be respectively coupled to a corresponding storage, for accessing the corresponding memory device. The bridge controller 350 is coupled between the data storage device 380 and the host device 370. The bridge controller 350 may generate a corresponding access control signal in response to an access command received from the host device 370, so as to access the corresponding storage.

Each storage may comprise a memory device, such as one of the memory devices 320-1, 320-2, . . . 320-N and a memory controller, such as one of the memory controllers 310-1, 310-2, . . . 310-N. The memory controllers 310-1, 310-2, . . . 310-N may be respectively coupled to the corresponding memory device, for accessing the corresponding memory device.

According to an embodiment of the invention, the storages 300-1, 300-2, . . . 300-N may be implemented in the way as the storage 100 or the storage 200 illustrated above, and the memory devices, such as the memory devices 320-1, 320-2, . . . 320-N, comprised in the storages 300-1, 300-2, . . . 300-N may be respectively a non-volatile memory device (such as a flash memory) and may comprise one or more memory elements, such as one or more flash memory dies, one or more flash memory chips, or the likes. In addition, the memory controllers, such as the memory controllers 310-1, 310-2, . . . 310-N, comprised in the storages 300-1, 300-2, . . . 300-N may also be implemented in the way as shown in FIG. 1 or FIG. 2. Therefore, the detailed descriptions regarding the storages 300-1, 300-2, . . . 300-N may refer to the decryptions for FIG. 1 and FIG. 2, and are omitted here for brevity.

In addition, in some embodiments of the invention, the memory controllers 330-1, 330-2, . . . 330-N, comprised in the storage modules SM-1, SM-2, . . . SM-N may also be implemented in the way as shown in FIG. 1 or FIG. 2. Therefore, the detailed descriptions regarding the memory controllers 330-1, 330-2, . . . 330-N may refer to the descriptions with respect to FIG. 1 and FIG. 2, and are omitted here for brevity.

As shown in FIG. 3, according to an embodiment of the invention, each storage module SM-1, SM-2, . . . SM-N may comprise two memory controllers coupled with each other, such as the two interconnected memory controllers 310-1 and 330-1, the two interconnected memory controllers 310-2 and 330-2, . . . and the two interconnected memory controllers 310-N and 330-N. The two interconnected memory controllers may be selected as the same memory controller, as an example, the two memory controllers may be the same type of controller chips (e.g. the controller chips having the same product number or serial number), or the two memory controllers may be identical (that is, having the same hardware, software and/or firmware design), or the two memory controllers may be implemented in compliance with the same communication protocol and may be the same or different types of controller chips (e.g. the controller chips having the same product number or the same serial number or having different product numbers or different serial numbers). As an example, the two memory controllers may be the same or different types of UFS memory controllers. The host interfaces (or, may be the UFS interface when the storage is implemented as a UFS device) of two memory controllers may be connected with each other through the corresponding bus, such as one of the buses 340-1, 340-2, . . . 340-N, so that the two interconnected memory controllers may communicate with each other through these two interfaces.

According to an embodiment of the invention, the memory controllers 310-1, 310-2, . . . 310-N, comprised in the storages 300-1, 300-2, . . . 300-N may be configured to operate in a device mode, and the memory controllers 330-1, 330-2, . . . 330-N coupled to the storages 300-1, 300-2, . . . 300-N may be configured to operate in a host mode.

According to an embodiment of the invention, the two memory controllers coupled with each other, such as the two interconnected memory controllers 310-1 and 330-1, the two interconnected memory controllers 310-2 and 330-2, . . . and the two interconnected memory controllers 310-N and 330-N, may be both configured with the hardware devices and corresponding firmware and software structures for operating in the host mode, and, and may be also equipped with the hardware devices and corresponding firmware and software structures for operating in the device mode. In this manner, in the embodiments of the invention, the same memory controllers may be applied to different devices, such as the storage and the data storage device as illustrated above, at the same time by simply setting different operation modes.

According to an embodiment of the invention, the bridge controller 350 may be coupled to the memory controllers 330-1, 330-2, . . . 330-N through the buses 360-1, 360-2, . . . 360-N, so as to access the corresponding storages 300-1, 300-2, . . . 300-N through the memory controllers 330-1, 330-2, . . . 330-N. The bridge controller 350 may generate a plurality of chip enable signals, such as the chip enable signals CE-1 to CE-N. One of the chip enable signals CE-1 to CE-N may be provided to one of the storage modules SM-1 to SM-N, for enabling the corresponding storage module, respectively. The bridge controller 350 is further coupled to the host device 370 through the bus 390 and generates at least one of the chip enable signals CE-1 to CE-N in response to an access command received from the host device 370.

Figure 4:
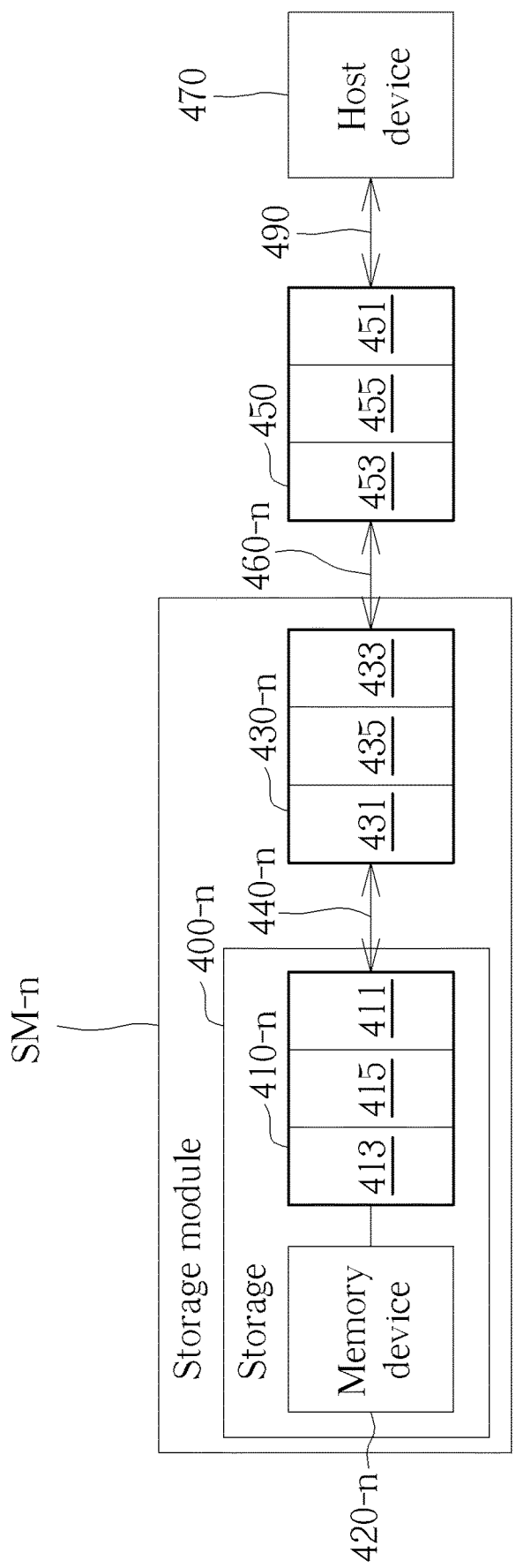
FIG. 4 shows a more detailed block diagram of an exemplary data storage system according to an embodiment of the invention.

FIG. 4 shows a more detailed block diagram of an exemplary data storage system according to an embodiment of the invention. In FIG. 4, only one storage module is shown, for illustrating the access operation of the storage module in more detailed. The data storage system may at least comprise a bridge controller 450 and a data storage device. The data storage device may comprise a plurality of storage modules, and the storage modules may have the same or similar structure and may operate in the same or similar manner. In order to simplify the illustration and description, in FIG. 4, the memory module SM-n is used as a representative of the plurality of storage modules, wherein n is a positive integer, and 0<n<=N.

The storage module SM-n may comprise a storage 400-n and a memory controller 430-n, and the storage 400-n may comprise a memory device 420-n and a memory controller 410-n. The bridge controller 450 is coupled between the memory controller 430-n and the host device 470, and the bridge controller 450 generates a corresponding access control signal in response to an access command received from the host device 470, so as to access corresponding memory device 420-n through the memory controllers 430-n and 410-n.

As described above, according to an embodiment of the invention, the storage module SM-n may comprise two interconnected memory controllers 410-n and 430-n, wherein the two interconnected memory controllers may be selected as the same memory controller, as an example, the two memory controllers may be the same type of controller chips (e.g. the controller chips having the same product number or serial number), or the two memory controllers may be identical (that is, having the same hardware, software and/or firmware design), or may be the memory controllers implemented in compliance with the same communication protocol but may be the same or different types of memory controllers (e.g. having the same product number or the same serial number or having different product numbers or different serial numbers). According to an embodiment of the invention, the memory controller 410-n may comprise transmission interfaces 411 and 413 and a control unit 415, wherein the memory controller 410-n may be implemented in the manner as shown in FIG. 1 or FIG. 2, Therefore, the transmission interface 411 may be the aforementioned host interface, and the transmission interface 413 may be the aforementioned memory interface. In addition, the memory controller 430-n may comprise transmission interfaces 431 and 433 and a control unit 435, wherein the memory controller 430-n may also be implemented in the manner as shown in FIG. 1 or FIG. 2. Therefore, the transmission interface 431 may be the aforementioned host interface, and the transmission interface 433 may be the aforementioned memory interface.

In addition, according to an embodiment of the invention, the bridge controller 450 may also be a memory controller comprising the transmission interfaces 451 and 453 and the control unit 455, and may also be implemented in the manner as shown in FIG. 1 or FIG. 2. The transmission interface 451 may be the aforementioned host interface, and the transmission interface 453 may be the aforementioned memory interface.

According to an embodiment of the invention, the transmission interfaces 411, 413, 431, 433, 451 and 453 may be respectively configured to communicate with a device or a transmission interface coupled thereto in compliance with a corresponding standard communication protocol, wherein the transmission interface 411 is coupled to the transmission interface 431 through the bus 440-n, so that the memory controllers 430-n and 410-n may be interconnected through the transmission interfaces 411 and 431 and may communicate with each other through the transmission interfaces 411 and 431. The transmission interface 413 is configured to communicate with the memory device 420-n, and the transmission interface 433 is coupled to the transmission interface 453 through the bus 460-n, so that the memory controller 430-n and the bridge controller 450 may communicate with each other through the transmission interfaces 433 and 453, and the bridge controller 450 may further communicate with the host device 470 through the transmission interface 451 and the bus 490.

The control units 415, 435, and 455 may be implemented as the control unit 115. That is, the control units 415, 435, and 455 may comprise a microprocessor, a read-only memory, and a buffer memory, etc., respectively, and may be configured to execute built-in program codes, thereby making the memory controllers 410-n and 430-n and the bridge controller 450 have corresponding function. The control units 415, 435 and 455 may be respectively configured to control transmissions and receptions of the signals and packets between the two transmission interfaces 411 and 413, 431 and 433 and 451 and 453 and process the received signals and packets or the signals and packets to be transmitted in compliance with the corresponding standard communication protocol, and may be further configured to perform and control the format conversion of the signals and the packets, so that the signals and packets are transmitted in correct data format through the corresponding transmission interfaces.

According to an embodiment of the invention, the memory device 420-n may be a flash memory, and the transmission interfaces 413, 433 and 453 may be flash memory interfaces. For example, when the memory device 420-n is implemented as a NAND type flash memory, the transmission interfaces 413, 433 and 453 are NAND type flash memory interfaces.

In addition, according to an embodiment of the invention, when the storage 400-n is implemented as a UFS device, the transmission interfaces 411 and 431 may be UFS interfaces, and the memory controller 430-n may communicate with the storage 400-n through the transmission interface 431 in compliance with the corresponding UFS communication protocol for accessing the storage 400-n.

In addition, according to an embodiment of the invention, the transmission interface 451 may be a Peripheral Component Interconnect Express (PCIe) interface or a Universal Serial Bus (USB) interface, the bridge controller 450 may communicate with the host device 470 through the transmission interface 451 in compliance with the corresponding PCIe or the USB protocol.

As discussed above, in some embodiments of the invention, the memory controllers 410-n and 430-n may be selected as the same memory controller, as an example, the two memory controllers may be the same type of controller chips (e.g. having the same product number or serial number), or the two memory controllers may be identical (that is, having the same hardware, software and/or firmware design), or the two memory controllers may be the memory controllers implemented in compliance with the same communication protocol but may be the same or different types of memory controllers (e.g. having the same product number or the same serial number or having different product numbers or different serial numbers). In other words, in some embodiments of the invention, the storage module SM-n may be equipped with the same memory controller as the one inside of the storage 400-n, wherein the host interfaces of the two memory controllers (or, when the storage 400-n is implemented as a UFS device, they may be UFS interfaces) may be connected to each other through corresponding bus, so that the two memory controllers in the storage module SM-n may communicate through these two interfaces.

It should be noted that the aforementioned implementations are only a portion of a variety of implementations to implement the invention, and the invention should not be limited thereto. In other embodiments of the invention, the memory controllers 410-*n* and 430-*n* may also be selected as different memory controllers.

According to an embodiment of the invention, the memory controller 410-*n* may be configured to operate in a device mode, and the memory controller 430-*n* may be configured to operate in a host mode. In addition, the bridge controller 450 may also be a memory controller and configured to operate in a device mode. In some embodiments of the embodiments of the invention, the memory controllers 410-*n* and 430-*n* may be both equipped with hardware devices and corresponding firmware and software structures for performing host mode operations, and may be also equipped with hardware devices and corresponding firmware and software structures for performing device mode operations. In this manner, in the embodiments of the invention, by properly configuring the corresponding operation mode, the same memory controller may be used in both the storage and the data storage device.

According to an embodiment of the invention, the memory controller may be configured to operate in the device mode or the host mode by means of software or hardware configuration. For example, the memory controller may comprise a register for storing the setting value regarding the operation mode. By executing the corresponding software program codes, such as the aforementioned ISP code, the control unit of the memory controller may set the setting value stored in the register. When the setting value stored in the register is set to a first value, the control unit may operate in a host mode, thereby configuring the memory controller to operate in the host mode. When the setting value stored in the register is set as a second value, the control unit may operate in a device mode, thereby configuring the memory controller to operate in the device mode. For another example, the memory controller may comprise a setting pin, for example, a general-purpose input/output (GPIO) pin, and the memory controller may determine which mode to operate in according to a value of the setting pin. When the setting pin is set to a first value, the control unit may operate in a host mode, thereby configuring the memory controller to operate in the host mode. When the setting pin is set to a second value or is not set, the control unit may operate in a device mode, thereby configuring the memory controller to operate in the device mode.

According to an embodiment of the invention, when the memory controller and/or the control unit thereof is configured to operate in the host mode, the transmission interface thereof, such as the aforementioned flash memory interface, operates in a slave mode, and when the memory controller and/or the control unit thereof is configured to operate in the device mode, transmission interface thereof operates in a master mode.

Therefore, in some embodiments of the invention, on the basis of the aforementioned host mode and device mode configurations, the transmission interface 433 may operate in the slave mode and the transmission interface 453 may operate in the master mode.

According to an embodiment of the invention, when the memory controller operates in the host mode, the control unit of the memory controller may be a Host Controller Interface (HCI) for mastering the overall communication protocol of the memory controller. For example, when the memory controller operates in the host mode, the control unit of the memory controller may actively set the corresponding register, and the hardware devices in the memory controller for performing the operation in the host mode and the corresponding firmware and software structure may operate according to the setting value of the register, so that the data to be transmitted through each transmission interface will have the format that conforms to the corresponding communication protocol. In this manner, each transmission interface may directly transmit signals and packets having correct data format, and may correctly interpret the content of the received signals and packets as well. When the memory controller operates in the device mode, the hardware devices in the memory controller for performing the operation in the device mode and the corresponding firmware and software structure may be configured to perform the corresponding communication protocol. As an example, the control unit and the associated components may receive and process signals and packets in compliance with the corresponding standard communication protocol.

Figure 5:
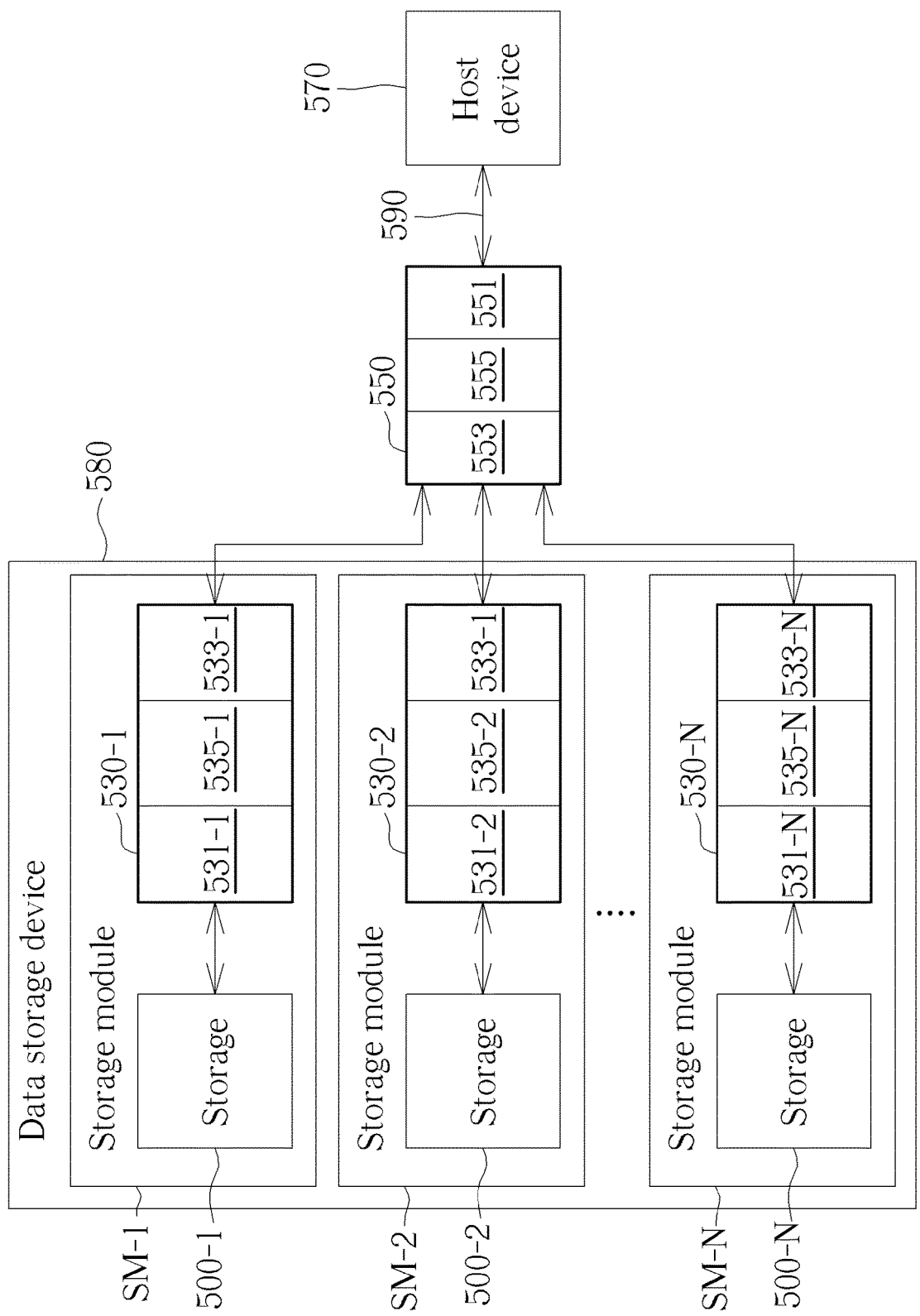
FIG. 5 is a schematic diagram showing an implementation of the data storage system according to an embodiment of the invention.

FIG. 5 is a schematic diagram showing an implementation of the data storage system according to an embodiment of the invention. The data storage system may comprise a bridge controller 550 and a data storage device 580. The data storage device 580 may comprise a plurality of storage modules SM-1, SM-2 . . . SM-N, where N is a positive integer greater than one. The storage modules SM-1, SM-2 . . . SM-N may have the same or similar structure and may function in the same or similar manner. Each storage module may comprise a storage, such as one of the storages 500-1, 500-2 . . . 500-N, and a memory controller, such as one of the memory controllers 530-1, 530-2 . . . 530-N. The memory controllers 530-1, 530-2 . . . 530-N may be respectively coupled to a storage for accessing the corresponding storage. The bridge controller 550 is coupled between the data storage device 580 and the host device 570, and the bridge controller 550 may generate a corresponding access control signal in response to an access command received from the host device 570 so as to access the corresponding storage.

In this example, the bridge controller 550 may be a Non-Volatile Memory Express (NVMe) controller, the memory controllers 530-1, 530-2 . . . 530-N may be UFS memory controllers, and the storages 500-1, 500-2 . . . 500-N may be UFS devices. The bridge controller 550 may comprise a PCIe interface 551, a flash memory interface 553 operating in master mode, and a control unit 555. The memory controllers 530-1, 530-2 . . . 530-N may respectively comprise one of UFS interfaces 531-1, 531-2 . . . 531-N, one of the flash memory interfaces 533-1, 533-2 . . . 533-N which operate in slave mode, and one of the control units 535-1, 535-2 . . . 535-N. The storages 500-1, 500-2 . . . 500-N may respectively comprise a UFS memory controller and a memory device as described above.

In this embodiment, the bridge controller 550 may be configured to operate in device mode, the memory controllers 530-1, 530-2 . . . 530-N may be configured to operate in host mode, and the UFS memory controller inside of the storages 500-1, 500-2 . . . 500-N may be configured to operate in device mode. The control units 535-1, 535-2 . . . 535-N and 555 may be configured to execute built-in program codes, thereby making the memory controllers 530-1, 530-2 . . . 530-N and the bridge controller 550 have corresponding functions, and the control units 535-1, 535-2 . . . 535-N and 555 may be respectively configured to control transmissions and receptions of the signals and packets between the transmission interfaces and process the received signals and packets or the signals and packets to be transmitted in compliance with the corresponding standard communication protocol, and perform and control format conversion of the signals and the packets, so that the signals and packets are transmitted in correct data format through the corresponding transmission interfaces.

According to an embodiment of the invention, the memory controllers 530-1, 530-2 . . . 530-N and the UFS memory controllers inside the storages 500-1, 500-2 . . . 500-N may be the same UFS memory controller, and such UFS memory controller may be equipped with hardware devices and corresponding firmware and software structures for performing host mode operations, and may be also equipped with hardware devices and corresponding firmware and software structures for performing device mode operations. In this manner, in the embodiment of the invention, the same UFS memory controller may be used in both the storage and the data storage device at the same time by simply configuring the corresponding operation mode, so as to realize the proposed data storage system.

In this embodiment, the bridge controller 550 may communicate with the host device 570 through the PCIe interface 551 in compliance with the NVMe protocol. When the host device 570 wants to access the data storage device 580, the host device 570 sends an access command or data to the bridge controller 550 in compliance with the NVMe protocol, wherein the access command may comprise the logical address to be accessed by the host device 570, such as the logical block address (LBA). The bridge controller 550 may convert the command or data into a data format that is recognizable for the memory controllers 530-1, 530-2 . . . 530-N, as an example, packaging the data into a packet in compliance with the corresponding communication protocol, convert the logical address to be accessed by the host device 570 into addresses identifiable by the memory controllers 530-1, 530-2 . . . 530-N, and determine which storage is the object of this access operation according to the logical address to be accessed by the host device 570.

For example, assuming that the capacity of a storage in the data storage device 580 is 2 TB, when the logical address requested to be accessed by the host device 570 is between 0 TB~(2T−1) B after the address translation or calculation, the bridge controller 550 may set the chip enable signal CE-1 to an enabled state so as to enable the storage module SM-1, and transmit the corresponding access command to the data storage device 580 through the flash memory interface and the bus, for the memory controller 530-1 to be able to receive the corresponding access command. For another example, when the logical address requested to be accessed by the host device 570 is between 2 TB~(4T−1) B after the address translation or calculation, the bridge controller 550 may set the chip enable signal CE-2 to an enabled state so as to enable the storage module SM-2, and transmit the corresponding access command to the data storage device 580 through the flash memory interface and the bus, for the memory controller 530-2 to be able to receive the corresponding access command, and so on. Next, the memory controllers 530-1, 530-2, . . . 530-N may further convert the commands, addresses, and/or data into the data type recognizable by the memory controllers inside the storages 500-1, 500-2, . . . 500-N, and send the packet to the corresponding storage 500-1, 500-2 . . . 500-N through the UFS interface 531-1, 531-2 . . . 531-N in compliance with the UFS communication protocol to complete the access operation of the storage.

According to an embodiment of the invention, assuming that the upper limit of the capacity of each storage in the data storage device 580 is 2 TB, the overall capacity of the data storage device 580 may be expanded to (2*N) TB, making the data storage device 580 to become a mass data storage device. It should be noted that, the invention is not limited to configure storages with the same capacity in the data storage device 580. That is, in the embodiments of the invention, the storages in the data storage device 580 may have the same or different memory capacities. In addition, it should be noted that although in the above embodiment, each storage module is coupled to the bridge controller through the corresponding bus, the invention is not limited to such an implementation. In some embodiments of the invention, the storage modules SM-1 to SM-N may also be coupled to the bridge controller through a common bus, and the memory controllers in the storage modules SM-1 to SM-N may determine whether to perform the corresponding access operation in response to the access control signal on the common based on whether the received chip enable signal (e.g. the corresponding one of the enable signals CE-1 to CE-N) has been set to the enabled state.

In addition, it should be noted that, although the above embodiments are illustrated with a flash memory device and a UFS device as examples, the invention is not limited thereto. In other embodiments of the invention, the memory device may also be other types of memory, and the storage may also be implemented as a storage or storage device supporting other standard communication protocols.

In addition, it should be noted that, although the above embodiments are described with an NVMe controller as an example, the invention is not limited thereto. In other embodiments of the invention, the bridge controller may also be implemented as a controller supporting other standard communication protocols. For example, the bridge controller may also be implemented as a USB controller. In such embodiment, the bridge controller may communicate with the host device through the USB interface in compliance with the USB Small Computer System Interface (SCSI) protocol. For example, when the host device wants to access the data storage device, the host device may send the access commands or data to the bridge controller in compliance with the USB (SCSI) protocol. The bridge controllers may convert the commands or data into a data format that is recognizable for the memory controllers (such as the memory controllers 530-1, 530-2 . . . 530-N), as an example, the bridge controllers may package the data into a packet in compliance with the corresponding protocol, convert the logical address requested to be accessed by the host device into an address identifiable by memory controller, determine which storage is the object of this access operation according to the logical address to be accessed by the host device and then enable the corresponding storage module through the chip enable signal to complete the access operation of the storage. The detailed operations of the bridge controller when being implemented as a controller supporting other standard communication protocols are substantially the same as the above embodiments; therefore, reference may be made to the descriptions of the above embodiments, and the details are omitted here for brevity.

In the embodiment of the invention, by interconnecting two controllers, such as the bridge controller and the memory controller, through the predetermined transmission interfaces, such as the flash memory interfaces, a hierarchical structure can be established based on the existing storage devices or storages, and the hierarchical structure is utilized to expand the total storage capacity of the data storage device, so as to form a large-capacity data storage device. For example, assuming that a storage or a memory device has a maximum capacity of 2 TB due to the circuit size constrain, the capacity of the data storage device constructed based on the proposed hierarchical structure may be expanded to (2*N) TB. In this manner, the capacity upper limit of the existing memory device may be overcome, and the capacity of the data storage device may be increased and optimized. In addition, in the embodiment of the invention, the bridge controller and the memory controller may be respectively configured to operate in the device mode and the host mode, so as to cooperate with each other to complete the bridge operation.

In addition, in the embodiments of the invention, the two memory controllers connected to each other inside the storage module may be the same memory controller, so that only one memory controller circuit or chip needs to be designed and taped out, and via the aforementioned operation mode configurations, such a memory controller circuit or chip has two different applications, which effectively saves the manufacturing cost and effectively solves the problem that the two devices cannot be compatible with each other due to different versions (e.g. developed based on different versions of standard). For example, according to the definition in the UFS standard, the UFS 3.1 and UFS 3.0 versions cannot be compatible with each other because the lengths of the descriptors defined in the respective standards are different. If the host device adopts the host platform developed in compliance with UFS 3.1, the firmware of the corresponding device must be implemented in compliance with the UFS 3.1 standard, otherwise there will be differences in compatibility, which will cause the host device to be unable to operate the device correctly, and vice versa. Considering of this constrain, in the embodiment of the invention, the two memory controllers connected to each other inside the storage module are selected as the same memory controller, or the two memory controllers are the memory controllers having the corresponding host interface implemented in compliance with the same standard. Therefore, under the proposed structure, the two interconnected host interfaces within the storage module, such as the UFS interfaces mentioned above, will be the transmission interfaces manufactured by the same process or implemented in compliance with the same version of standard, which effectively solves the abovementioned problem of incompatibility between the two devices due to different versions of standard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
   a plurality of storage modules, wherein each storage module comprises:
      a storage, comprising:
         a memory device; and
         a first memory controller, coupled to the memory device and configured to access the memory device; and
      a second memory controller, coupled to the storage and configured to access the storage,
   wherein the first memory controller comprises a first transmission interface, the second memory controller comprises a second transmission interface, and the first memory controller and the second memory controller communicate with each other through the first transmission interface and the second transmission interface; and multiple memory controllers respectively corresponding to the same or different types are coupled to each other through their respective transmission interfaces corresponding to a same communication protocol, for implementing multiple layers of memory controllers with interconnected memory controllers, the interconnected memory controllers comprising the multiple memory controllers, wherein the multiple memory controllers comprise the first and the second memory controllers.

2. The data storage device as claimed in claim 1, wherein the first memory controller operates in a device mode and the second memory controller operates in a host mode.

3. The data storage device as claimed in claim 1, wherein the first memory controller and the second memory controller are the same type of memory controllers, or are identical, or are implemented in compliance with the same communication protocol no matter whether the first memory controller and the second memory controller are the same or different types of memory controllers.

4. The data storage device as claimed in claim 1, wherein the first transmission interface and the second transmission interface are Universal Flash Storage (UFS) interfaces.

5. The data storage device as claimed in claim 1, further comprising:
   a bus, coupled between the first memory controller and the second memory controller for connecting the first transmission interface and the second transmission interface.

6. A data storage device, comprising:
   a plurality of memory devices;
   a plurality of first memory controllers; and
   a plurality of second memory controllers,
   wherein one of the first memory controllers is coupled between one of the memory devices and one of the second memory controllers and configured to access said one of the memory devices, and
   wherein the first memory controllers and the second memory controllers are the same memory controllers; and multiple memory controllers respectively corresponding to the same or different types are coupled to each other through their respective transmission interfaces corresponding to a same communication protocol, for implementing multiple layers of memory controllers with interconnected memory controllers, the interconnected memory controllers comprising the multiple memory controllers, wherein the multiple memory controllers comprise said one of the first memory controllers and said one of the second memory controllers.

7. The data storage device as claimed in claim 6, wherein the first memory controllers operate in a device mode and the second memory controllers operate in a host mode.

8. The data storage device as claimed in claim 6, wherein said one of the first memory controllers comprises a first transmission interface, said one of the second memory controllers comprises a second transmission interface, and said one of the first memory controllers and said one of the second memory controllers communicate with each other through the first transmission interface and the second transmission interface.

9. The data storage device as claimed in claim 8, wherein the first transmission interface and the second transmission interface are Universal Flash Storage (UFS) interfaces.

10. The data storage device as claimed in claim 8, further comprising:
    a bus, coupled between said one of the first memory controllers and said one of the second memory controllers for connecting the first transmission interface and the second transmission interface.

11. A data storage system, comprising:
a plurality of storages, each comprising:
   a memory device; and
   a first memory controller, coupled to the memory device and configured to access the memory device;
a plurality of second memory controllers, coupled to the storages and configured to access the storages, wherein one of the second memory controllers and one of the storages form a storage module; and
a bridge controller, coupled to the second memory controllers and configured to access the storages through the second memory controllers;
wherein multiple memory controllers respectively corresponding to the same or different types are coupled to each other through their respective transmission interfaces corresponding to a same communication protocol, for implementing multiple layers of memory controllers with interconnected memory controllers, the interconnected memory controllers comprising the multiple memory controllers, wherein the multiple memory controllers comprise the first memory controller within said one of the storages and said one of the second memory controllers.

12. The data storage system as claimed in claim 11, wherein the first memory controllers comprised in the storages and the second memory controllers are the same type of memory controllers, or are identical, or are implemented in compliance with the same communication protocol no matter whether the first memory controllers and the second memory controllers are the same or different types of memory controllers.

13. The data storage system as claimed in claim 11, wherein the bridge controller generates a plurality of chip enable signals, one of the chip enable signals is provided to one of the second memory controllers for enabling the corresponding storage module.

14. The data storage system as claimed in claim 13, wherein the bridge controller is further coupled to a host device and configured to generate at least one of the chip enable signals in response to an access command received from the host device.

15. The data storage system as claimed in claim 11, further comprising:
   a plurality of buses, coupled between the storages and the second memory controllers.

* * * * *